Feb. 18, 1930.  E. W. WEATHERS  1,747,561
SUPPORT FOR VEHICLE PRIME MOVERS
Filed Dec. 4, 1926

INVENTOR.
EATHELBERT W. WEATHERS
BY A.B. Bowman
ATTORNEY

Patented Feb. 18, 1930

1,747,561

UNITED STATES PATENT OFFICE

EATHELBERT W. WEATHERS, OF SAN DIEGO, CALIFORNIA

SUPPORT FOR VEHICLE PRIME MOVERS

Application filed December 4, 1926. Serial No. 152,566.

This invention relates to supports, and more particularly to a support or sub-base for a prime mover and electric generator unit, such as the engine and generator of a motor vehicle.

The objects of the invention are: First, to provide a sub-base which will enable the installation of an engine and generator unit on the frame or chassis of a motor vehicle, so as to maintain the engine and generator in perfect alinement under all the weaving of the frame or chassis due to the uneven road surfaces traversed by the vehicle; second, to provide a sub-base of this class which will be simple in construction, rugged and readily accessible; third, to provide a sub-base of the character stated which is particularly suitable for the support of the generator ahead of the engine, or between the engine and radiator of the motor vehicle, and fourth, to provide a sub-base as above described which is particularly suitable for the support of the external revolving armature type of electric generator.

Figure 1:
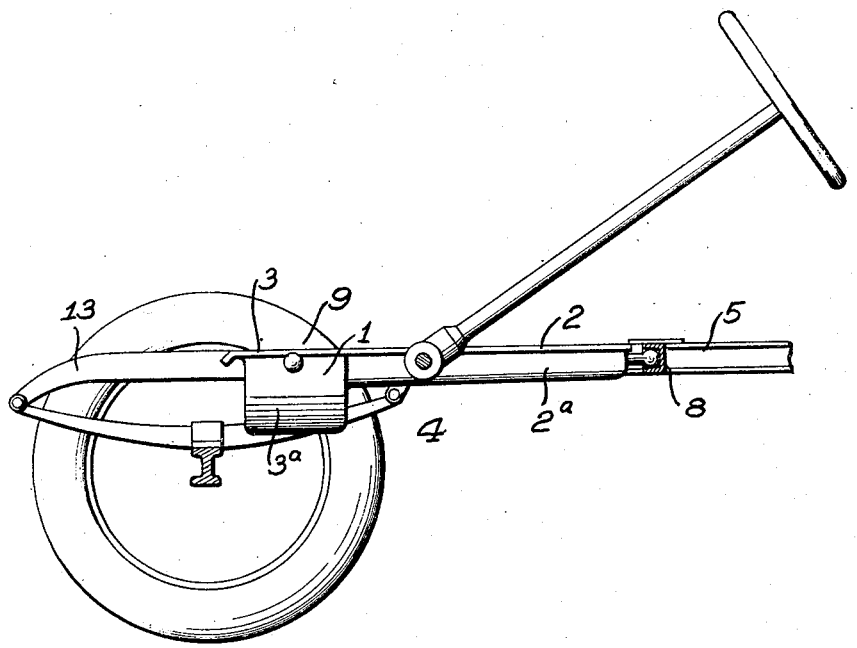
Figure 2:
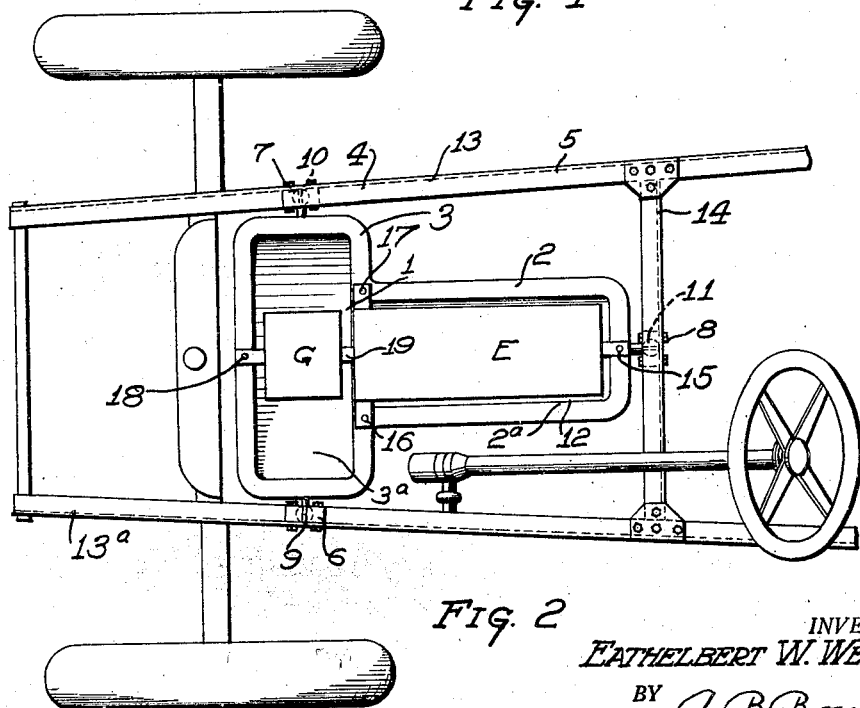

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevation of a sub-base embodying my invention, shown mounted on the frame of a motor vehicle supporting the engine and generator of the vehicle, and Fig. 2 is a plan view of my invention as illustrated in Fig. 1.

Similar characters of reference refer to similar parts in all the figures.

My sub-base comprises a sheet steel frame 1 of general T-shaped formation with a longitudinal leg member 2 and a transverse head member 3 at the forward end of said leg member, there being depressions 2ª and 3ª formed in the members 2 and 3, respectively. The sub-base is placed on a motor vehicle, designated 4, with its head member 3 forwardly of its leg member 2 and the base is swively connected to the vehicle frame 5 at three bearing points 6, 7 and 8 by means of universal joints 9, 10 and 11, the universal joints 9 and 10 connecting the base at the sides of the head member 3 to the side members 12 and 13 at the points 6 and 7, respectively, of the vehicle frame 5, and the universal joint 11 connecting the base at the rear end of the leg member 3 to a cross member 14 of the vehicle frame 5 at the point 8.

Provision is made for the suspension of an engine E and generator G on the sub-base within the depressions 2ª and 3ª, respectively, at four points 15, 16, 17 and 18; the point 15 being located on the rear end of the leg member 2 of the frame 1 on the longitudinal center of the frame, the points 16 and 17 being located at opposite sides of the forward end of the frame member 2 at the intersections of said member and the cross head member 3, and the point 18 being located at the forward end of the head member 3 on the longitudinal center of the frame. The engine E is suspended from and within the member 2 of the sub-base at three points 15, 16 and 17, at its rear end at 15 and at its forward corners at 16 and 17, while the generator G is suspended from and within the member 3 of the sub-base at its forward end at one point 18, the rear end of the generator being supported by its shaft 19' on the forward end of the engine E.

The forward end of the sub-base is reinforced by the shell of metal, formed by the depression 3ª, in a circular form from side to side under the wide part where the generator is mounted. This gives strength, also protection to the revolving external armature of the generator.

All strains and weaving of the motor vehicle frame or chassis are relieved before they reach the engine and generator unit in the seven point mounting as shown.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a support of the character as disclosed, in combination with a frame, a sub-base, means for yieldingly supporting said sub-base at three points on said frame, and means for supporting an engine and generator on said sub-base.

2. In a support of the character as disclosed, in combination with a frame, a sub-base, means for yieldingly supporting said sub-base at three points on said frame, and means for supporting an engine and generator at four points on said sub-base.

3. In a support of the character as disclosed, in combination with a frame, a sub-base, means for yieldingly supporting said sub-base at three points on said frame, means for supporting an engine at three points on said sub-base, and means for supporting a generator on said sub-base at one point, the generator being otherwise supported on the engine.

4. In combination with a frame, a sub-base, means for yieldingly supporting said sub-base at its rear end on said frame, means for yieldingly supporting the forward end of said sub-base at its sides on said frame, and means for supporting an engine and a generator on said sub-base at four points.

5. In a support for combined engine and generator, the combination with a frame of a T-shaped sub-base with depressions therein adapted to receive an engine and connected generator, means for yieldingly supporting said sub-base at the opposite ends of the transverse portion of said T-shaped sub-base on said frame and at the middle portion of the end of the leg portion of said T-shaped sub-base on said frame.

6. In a support for combined engine and generator, the combination with a frame of a T-shaped sub-base with depressions therein adapted to receive an engine and connected generator, means for yieldingly supporting said sub-base at the opposite ends of the transverse portion of said T-shaped sub-base on said frame and at the middle portion of the end of the leg portion of said T-shaped sub-base on said frame, and means for supporting an engine and generator at four points on said sub-base.

7. In a support for combined engine and generator, the combination with a frame of a T-shaped sub-base with depressions therein adapted to receive an engine and connected generator, means for yieldingly supporting said sub-base at the opposite ends of the transverse portion of said T-shaped sub-base on said frame and at the middle portion of the end of the leg portion of said T-shaped sub-base on said frame, and means for supporting an engine and generator at four points on said sub-base, said engine being supported at three points on said sub-base and said generator at one point on said sub-base and on said engine.

In testimony whereof, I have hereunto set my hand at San Diego, California, this 27th day of November, 1926.

EATHELBERT W. WEATHERS.